United States Patent
Zhou

(10) Patent No.: US 10,042,433 B2
(45) Date of Patent: Aug. 7, 2018

(54) METHOD FOR INPUTTING CHINESE PHRASE

(71) Applicant: Lianhui Zhou, Zhangjiagang (CN)

(72) Inventor: Lianhui Zhou, Zhangjiagang (CN)

( * ) Notice: Subject to any disclaimer, the term of this patent is extended or adjusted under 35 U.S.C. 154(b) by 0 days.

(21) Appl. No.: 15/505,728

(22) PCT Filed: Jun. 15, 2015

(86) PCT No.: PCT/CN2015/000409
§ 371 (c)(1),
(2) Date: Feb. 22, 2017

(87) PCT Pub. No.: WO2016/197267
PCT Pub. Date: Dec. 15, 2016

(65) Prior Publication Data
US 2017/0277276 A1    Sep. 28, 2017

(30) Foreign Application Priority Data

Jun. 11, 2015   (CN) .......................... 2015 1 0319456

(51) Int. Cl.
| | |
|---|---|
| *H03M 11/00* | (2006.01) |
| *G06F 3/023* | (2006.01) |
| *G06F 17/22* | (2006.01) |
| *G06F 3/01* | (2006.01) |
| *G06F 17/27* | (2006.01) |

(52) U.S. Cl.
CPC ............ *G06F 3/0233* (2013.01); *G06F 3/018* (2013.01); *G06F 17/2223* (2013.01); *G06F 17/276* (2013.01)

(58) Field of Classification Search
CPC .... G06F 17/2223; G06F 17/276; G06F 3/018; G06F 3/0233
USPC ................................................. 341/28; 704/3
See application file for complete search history.

(56) References Cited

U.S. PATENT DOCUMENTS

| | | | | |
|---|---|---|---|---|
| 7,165,019 B1* | 1/2007 | Lee | ...................... | G06F 17/2715 704/10 |
| 2006/0048055 A1* | 3/2006 | Wu | ........................ | G06F 17/273 715/262 |
| 2006/0253427 A1* | 11/2006 | Wu | ...................... | G06F 17/3064 |
| 2009/0281787 A1* | 11/2009 | Wang | ................... | G06F 17/2223 704/2 |
| 2012/0323556 A1* | 12/2012 | Chen | ................... | G06F 17/2863 704/3 |
| 2013/0041647 A1* | 2/2013 | Ramerth | ............. | G06F 17/2863 704/2 |

(Continued)

*Primary Examiner* — Ojiako Nwugo
(74) *Attorney, Agent, or Firm* — Luoh J. Wu; Continent Patent Office LLP

(57) ABSTRACT

A method for inputting a Chinese phrase, and the said phrase includes 2- and 3-Chinese characters, if the phonetic code for inputting the said phrase is full Pinyin for the 1st character and abbreviation Pinyin for the 2nd and 3rd characters and the number of phrases for such a code is more than the presetting value, then the converted phonetic code combinations from the phrase dictionary database of the input method based on the said phonetic code will display on the input interface, that is full Pinyin is kept for the 1st character, all combinations of full Pinyin based on the abbreviation Pinyin are displayed for the 2nd character and abbreviation Pinyin is kept for the 3rd character.

3 Claims, 1 Drawing Sheet

```
  li'b              1/2
1.  li'bai
2.  li'bang
3.  li'bao
4.  li'bei
5.  li'bian
6.  li'biao
``` a

```
  li'b              2/2
1.  li'bie
2.  li'bin
3.  li'bing
``` b

(56) References Cited

U.S. PATENT DOCUMENTS

2014/0317564 A1* 10/2014 Odell .................... G06F 3/0482
715/810

* cited by examiner

| li'b | 1/2 |
|---|---|
| 1. li'bai | |
| 2. li'bang | |
| 3. li'bao | |
| 4. li'bei | |
| 5. li'bian | |
| 6. li'biao | | a

| li'b | 2/2 |
|---|---|
| 1. li'bie | |
| 2. li'bin | |
| 3. li'bing | | b

Fig.1

| jian's'j | 1/2 |
|---|---|
| 1. jian'san'j | |
| 2. jian'sha'j | |
| 3. jian'shang'j | |
| 4. jian'shao'j | |
| 5. jian'she'j | |
| 6. jian'sheng'j | | a

| jian's'j | 2/2 |
|---|---|
| 1. jian'shu'j | |
| 2. jian'su'j | | b

Fig.2

METHOD FOR INPUTTING CHINESE PHRASE

FIELD OF INVENTION

The present invention relates to computer processing of Chinese language information.

BACKGROUND OF INVENTION

Currently, Pinyin input method is literally a primary Chinese input method. As compared with other input method editors (IMEs), Pinyin IME has its natural advantages, because firstly every Chinese who starts learning Chinese characters today has to spend a lot of time in learning Pinyin or phonetic symbols, and Pinyin which is primarily used to mark the pronunciation of Chinese characters can easily act as a code for inputting Chinese characters; secondly, Pinyin is close to spoken Chinese such that Pinyin input method can be learnt within a short time.

However, Pinyin IME has a serious disadvantage, i.e., a substantially large number of Chinese characters are assigned to a homophone and the similar situation happens to 2-, 3-character phrases; only one Pinyin code by one stroke can be inputted on the current computer keyboard. As the phonetic code length of a Chinese character is usually 2-6 letters with 4 letters on an average, 4 strokes are needed to be typed on any available keyboard to input a full Chinese character code. To reduce the number of strokes, an input method of abbreviation Pinyin or a hybrid of abbreviation Pinyin with full Pinyin may be selected. However, if abbreviation Pinyin is used, a large number of 2-, -3-, and 4-character phrases to same homophone codes will be produced, wherein the user has to turn "pages" in IME interface to find the desired phrase. A few years ago, a solution of double Pinyin was proposed; however, due to conflicts between the typing codes and the difficulties in memorizing, it has been literally abandoned by most of the people.

While inputting the Chinese characters, it is a dilemma to achieve both fewer strokes and minimum phrases assigned to homophone codes. For phrases with 4 characters or above, the number of phrases to the homophone is not so many, even if abbreviation Pinyin is used and the user does not need to scroll the screen to find the desired phrase. However, since 2-, and 3-character phrases are used most frequently and account for up to 60%, wherein if abbreviation Pinyin or part abbreviation Pinyin is used, there will be many phrases for any phonetic code and often a Chinese character cannot be found until turning the interface a few pages, causing a lower input speed and poor experience for most of the users.

The object of the present invention is to provide a solution to input 2-3 character phrases with fewer strokes and minimum phrases assigned to the same homophonetic code.

SUMMARY OF INVENTION

The present invention provides a method which enables the user to input a 2- and 3-character phrase with both fewer strokes and minimum phrases assigned to the homophonetic code, and to find and select the desired phrase with less or even without turning pages,
including the following steps:
  i) for a 2 character phrase, the coding solution is full Pinyin for the first character, and abbreviation Pinyin for the second character (initial letter);
  ii) for a 3 character phrase, the coding solution is "full Pinyin for the first character+abbreviation Pinyin for the 2nd character (initial letter)+abbreviation Pinyin for the 3rd character (initial letter)".

With the above coding solutions, if the number of phrases assigned to the homephonetic code on the input interface is less than the presetting value, which is generally 5 according to the input method of the prior art, and is set herein as 6, then all these 6 Chinese phrases for a phonetic code will appear on the input interface and the user can find the desired phrase without "turning pages". If the number of phrases assigned to the same homephonetic code is more than such presetting value of 6, then the converted phonetic codes from the phrase dictionary database of the input method other than Chinese phrases will be displayed on the input interface, wherein:
  i) for a 2 character phrase, full Pinyin for the first character+full Pinyin for the second character (the initial letters thereof are the same as those for the corresponding abbreviation Pinyin);
  ii) for a 3 character phrase, full Pinyin for the first character+full Pinyin for the second character (the initial letters thereof are the same as those for the corresponding abbreviation Pinyin)+abbreviation Pinyin for the third character.

If there are 5 phrases on an average for a phonetic (full Pinyin+full Pinyin) code, then a display can provide 30 phrases, the advantage of which is that the user can immediately find out without turning pages, whether the code of full Pinyin or "full Pinyin+abbreviation Pinyin" for the desired phrase is displayed on the input interface, otherwise the user just types the letters of full Pinyin for the second character to correct typos.

A method for inputting a Chinese phrase, wherein the said phrase includes 2- and 3-characters and if the phonetic code for inputting the said phrase is full Pinyin for the 1st character and abbreviation Pinyin for the 2nd and 3rd characters and the number of phrases for such a code is more than the presetting value, then the converted phonetic code hybrid from the phrase dictionary database of the input method based on the said phonetic code will be displayed on the input interface, wherein full Pinyin is kept for the 1st character, all combinations of full Pinyin based on the abbreviation Pinyin are displayed for the 2nd character and abbreviation Pinyin is kept for the 3rd character; when the candidate number key for a phonetic code is selected on the input interface, all candidate phrases from the phrase dictionary database of the input method for such a code will display on the input interface and the corresponding phrase is inputted upon selection of a number key. Further, the said presetting value is preferably 6. For a 2 character phrase, full Pinyin for the first character+full Pinyin for the second character (the initial letters thereof are the same as those for the corresponding abbreviation Pinyin); for a phase with 3 characters, full Pinyin for the first character+full Pinyin for the second character (the initial letters thereof are the same as those for the corresponding abbreviation Pinyin)+abbreviation Pinyin for the third character.

If the number of phrases for the typed phonetic code does not exceed the presetting value (e.g., 6 for one screen) in order to display on the input interface, then all the candidate phrases will appear right on the input interface; if the number of phrases for the said phonetic code exceeds 6, the converted phonetic codes will appear on the input interface. For a phrase with 4 or more characters, this method is not recommended on the ground that if full Pinyin is used for the 1st character and abbreviation Pinyin for the 2nd, 3rd and 4th characters, the possibility of more than 2 phrases for a phonetic code is low even with a big dictionary database over one million phrases and if so, more than 5 phrases are quite rare. In addition, the reason why a pure abbreviation Pinyin is not used as a kind of index is that the abbreviation Pinyin code of a 2- or 3-character phrase uses the initial letters of full Pinyin of each character, and there are 6*6=36 combinations of full Pinyin code based on its abbreviation Pinyin code of a 2 character phrase (similar to a 3 character phrase) even if one initial letter produces only 6 combinations of full Pinyin code on an average, such that 6 pages are necessary to accommodate all combinations of full Pinyin codes, resulting in that the user has to turn pages to find the desired phrase, which is not in line with the object of the present invention for turning less pages and poses more harm than good.

BRIEF DESCRIPTION OF ACCOMPANYING DRAWINGS

FIG. 1 shows a schematic representation of the interface for inputting "li'b";

FIG. 2 shows a schematic representation of the interface for inputting "jian's'j".

DETAILED DESCRIPTION OF EMBODIMENTS OF INVENTION

The present invention is now described in detail with reference to the following exemplary embodiments.

EXAMPLE 1

If the user wants to input a company name " 立邦 ", firstly the phonetic code "li' b" is typed to allow the program instruction of the IME to determine that there are more than 6 phrases assigned to it, and then the program instruction reads out the phrase dictionary database of the IME and displays all the converted phonetic codes based on "li'b" including 9 phonetic codes of full Pinyin: li'bai, li'bang, li'bao, li'bei, li'bian, li'biao, li'bie, li'bin and li'bing, excluding: li'ba, li'bi, li'bo and li'bu. The user presses the number key "2" on the input interface to get the display below:
li'bang
1 立邦
By pressing Spacebar or number key "1", " 立邦 " is displayed on the screen.
If " 李冰 " is to be input, the user turns one page to get a display as in FIG. 1B and presses the number key "2" according to the displayed phrases: 李冰, 李兵, 雁病 and 礼兵; " 李冰 " is displayed on the screen by pressing Spacebar.
While the desired phrase is found by turning one page, if all the phrases based on the code "li'b" were displayed, it could not be found until turning 5 or 6 pages, because it would certainly be listed in the later pages based on the frequency of use of the phrases. Furthermore, in most cases, the user could not make sure whether this phrase is included in the phrase dictionary database. If 4 time typos need to be pressed for a full Pinyin code of the prior art, only 3 time typos need to be pressed using the method in accordance with the present invention. Thus, the user can quickly view the input interface to see if the desired phrase is displayed there. If "yes", presses the corresponding number key; if "not", immediately removes the abbreviation Pinyin for the 2nd character and instead, inputs 2 characters one by one. The uncertainties during the input process lower the input speed.

EXAMPLE 2

If the user wants to input " 建设局 ", "jian's'j" are typed and shown as in FIG. 2. The number key "5" is pressed to get
jian'she'j
1 建设局
" 建设局 " is displayed on the screen by pressing Spacebar. The phonetic code combinations for a 3 character phrase are less than those for a 2 character phrase.

Further examples in accordance with the present invention: if there are many combinations of full Pinyin for certain phrases, e.g., the combinations of full Pinyin codes with "l" as the initial letter thereof include 20 codes of lai, lan, lang, lao, lei, leng, lia, lian, liang, liao, lie, lin, ling, liu, long, lou, luan, lue, kun, luo, lve, excluding "la, le, li, lu and lv", then 2 or more code combinations can be listed on each row. For example, after "ji'l" is typed, the input interface can display:
  1. lai lan lang lao
  2. lei leng
  3. lian liang liao
  4. lie lin ling liu
  5. long lou
  6. luan lue lun luo
As such, the user can find the code for the desired phrase without turning pages; if " 寂 " " 寥 " is to be input, presses number key "3" to get a display on the input interface like:
  1. ji'lian
  2. ji'liang
  3. ji'liao
Press the number key "3" again
  ji'liao
  1 寂寥
  2 集料
Finally, presses Spacebar to get " 寂寥 " on the screen. When this phrase needs to be input in future, only "j'l" is required. As the program of input method typically has a function of sorting the phrase dictionary database by frequency of use, " 寂寥 " is listed in the first place on the IME interface, quicken the input speed.

The present invention has the following technical effects: i) the number of phrases assigned to the same phonetic code is reduced when the input method of "abbreviation Pinyin or abbreviation Pinyin+full Pinyin" is used and the turning of pages is substantially reduced; ii) by optimizing the strokes and the number of phrases assigned to the same phonetic code, the input speed is increased by more than 20% as compared with the prior art; iii) all the converted phonetic codes are displayed on the input interface to enable the user to see if the desired phrase exists, which reduces blindness, strokes and typos and increases the correctness of the inputs. With prompt of all the converted phonetic codes for the desired phrase, the intensity for the user to think about phonetic codes can be reduced and the typing speed is also increased. When applied to the touch screen of a mobile phone, benefits are more obvious.

What is claimed is:
1. A method for inputting a Chinese phrase, and the said Chinese phrase
  includes 2- and 3-Chinese characters wherein a phonetic code for
  inputting the said Chinese phrase is full Pinyin for a 1st character and abbreviation Pinyin for a 2nd and 3rd characters and when the number of phrases for the phonetic code is more than a presetting value, then converted phonetic code combinations from a phrase dictionary database will display on an input interface, wherein full Pinyin is displayed for the 1st character, all phonetic code combinations of full Pinyin based on the abbreviation Pinyin are displayed for the 2nd character and abbreviation Pinyin is displayed for the 3rd character; when the a candidate number for a phonetic code is selected, all candidate phrases associated with the candidate number from the phrase dictionary database for such a code will be displayed on the input interface will be entered on the screen upon selection of a candidate number key.

2. The method for inputting a Chinese phrase as claimed in claim 1, wherein the said presetting value is 6.

3. The method for inputting a Chinese phrase as claimed in claim 1, wherein the converted phonetic codes for both the 1st and 2nd characters are of full Pinyin, or in case of full Pinyin for the 1st and 2nd characters and abbreviation Pinyin of the initial letter for the 3rd character, all corresponding 2 or 3 character phrases will be displayed in the input window of interface, and the corresponding candidate phrase will be entered on the screen upon selection of a candidate number key.

* * * * *